(12) United States Patent
Hatayama et al.

(10) Patent No.: US 6,701,090 B1
(45) Date of Patent: Mar. 2, 2004

(54) WAVELENGTH DIVISION MULTIPLEXING SIGNAL NUMBER MONITORING APPARATUS AND METHOD

(75) Inventors: Hitoshi Hatayama, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 556 days.

(21) Appl. No.: 09/626,158

(22) Filed: Jul. 26, 2000

(30) Foreign Application Priority Data

Jul. 28, 1999 (JP) .......................................... 11/213804

(51) Int. Cl.$^7$ .............................................. H04J 14/02
(52) U.S. Cl. ............................ 398/79; 398/82; 398/84; 398/43; 398/33; 398/34; 385/24; 385/37; 385/31; 385/14; 385/43; 385/39
(58) Field of Search .............................. 398/79, 82, 84, 398/43, 33, 34; 385/24, 37, 31, 43, 39, 14

(56) References Cited

U.S. PATENT DOCUMENTS 5,940,555 A * 8/1999 Inaba et al. ................... 385/24
6,069,990 A * 5/2000 Okawa et al. ................. 385/43

OTHER PUBLICATIONS

"Wavelength demultiplexer module using polarization independent InP arrayed waveguide grating filters integrated with photodetectors", H. Sanjoh et al., The Conference of The Institute of Electronics, Information and Communication Engineers, (1998), p. 279.

"Gain control in optical linear–repeaters for WDM optical–path network", H. Suzuki et al., The Society Conference on The Institute of Electronics, Information and Communication Engineers, (1997), p. 359.

* cited by examiner

*Primary Examiner*—Leslie Pascal
*Assistant Examiner*—Hanh Phan
(74) *Attorney, Agent, or Firm*—McDermott, Will & Emery

(57) ABSTRACT

Wavelength division multiplexing signal light is fed into an arrayed diffraction grating type optical demultiplexer, demultiplexed signal light components are outputted from a plurality of output ports, whether there is a signal light component or not is detected by each photodiode of a photodiode array, and a counter unit calculates the number of signals from the result of detection. Here, the output wavelength interval of $\Delta\lambda o$ of the output ports is set to $\Delta\lambda o=\Delta\lambda i/m$ (where m is an integer of at least two) with respect to the signal wavelength interval $\Delta\lambda i$ of the wavelength division multiplexing signal light, whereas the photodiode array is sectioned into m photodiode array groups in which the output signal wavelength interval is $\Delta\lambda i$.

8 Claims, 6 Drawing Sheets

WAVELENGTH DIVISION MULTIPLEXING SIGNAL NUMBER MONITORING APPARATUS AND METHOD

BACKGROUND OF THE INVENTION

1. Field of the Invention

The present invention relates to a wavelength division multiplexing signal number monitoring apparatus and method for monitoring the number of signals in wavelength division multiplexing signal light in wavelength division multiplexing transmission systems.

2. Related Background Art

From social needs with the advent of highly technetronic society, there have been vigorous research and development concerning large-capacity, high-speed communications such as visual communications utilizing optical fiber transmission line networks and long-distance communications such as international communications. Here, wavelength division multiplexing (WDM) transmission systems, which perform high-speed/large-capacity optical communications by causing an optical fiber line to transmit therethrough a plurality of wavelengths of signal light (a plurality of signal light components having wavelengths different from each other), have been in the process of being developed and introduced as those responding to rapid increases in demands for communications due to the Internet and the like in recent years.

If the number of signals (number of channels) in signal light being transmitted changes, then the power of each signal light component may fluctuate in such a WDM transmission system because of transient fluctuations in amplification factor in an optical amplifier or the like. When the number of signal channels in the signal light being transmitted is constantly monitored, such a phenomenon of power fluctuation caused by changes in the signal number can be specified/detected so as to be distinguished from the changes in loss of the transmission line, whereby the power can be kept from fluctuating if the optical amplifier is controlled and so forth.

Known as such a signal number monitoring apparatus is one in which a demultiplexer/wavelength-branching device, such as an arrayed waveguide diffraction grating type optical demultiplexer, and light-receiving devices for detecting respective demultiplexed signal light components are combined together (see, e.g., the Institute of Electronics, Information and Communications Engineers, Communications Convention C-3-113, 1998).

FIG. 6 is a graph showing, in the case where wavelength division multiplexing signal light fed from a single input port of an arrayed waveguide diffraction grating type optical demultiplexer is branched/demultiplexed into a plurality of output ports corresponding to their respective predetermined output wavelengths, respective transmission characteristics (output wavelength characteristics) of five adjacent output ports from the (n−2)-th to the (n+2)-th output ports. Here, the center wavelength in the transmission characteristic curve of each output port is the output wavelength thereof, whereas the output wavelength interval Δλo between the adjacent output ports is made to coincide with the signal wavelength interval Δλi (Δλi=0.4 nm in FIG. 6) of wavelength division multiplexing signal light.

Thus, wavelength division multiplexing signal light is inputted to the arrayed waveguide diffraction grating type optical demultiplexer in which the output wavelength of each output port corresponds to the signal wavelength of respective one signal light component, the demultiplexed signal light output is detected by a light-receiving device such as photodiode connected to the respective output port, and a detection number which is the number of photodiodes having detected signal light is counted, whereby the number of signals can be monitored constantly.

SUMMARY OF THE INVENTION

In an arrayed waveguide diffraction grating type optical multiplexer/demultiplexer, e.g., normal silica waveguide type demultiplexer, however, the transmission wavelength characteristic of each waveguide greatly depends on temperature, so that the transmission characteristic curve shifts upon changes in temperature, whereby the output center wavelength shifts, for example, on the order of dk/dT=0.1 nm/10° C. This wavelength shift has a magnitude which is not negligible with respect to signal wavelength intervals of wavelength division multiplexing signal light. As a result, individual signal wavelengths of wavelength division multiplexing signal light and the respective output wavelengths outputted from output ports may lose their correspondence, so that, depending on the state of wavelength shift, for example, one channel of signal light may be outputted from two adjacent output ports, whereas two adjacent channels of signal light may be outputted from one output port, whereby the signal number cannot be counted accurately.

For example, if temperature rises by 20° C. from the state where the output wavelength of the n-th output port is 1550 nm in FIG. 6, then the transmission wavelength characteristic of each output port generates a wavelength shift of 0.2 nm toward the longer wavelength side. At this time, the n-th output port yields an output wavelength of 1550.2 nm, whereas the (n−1)-th output port yields an output wavelength of 1549.8 nm, whereby signal light having a signal wavelength of 1550 nm is outputted from both of these two output ports.

If the bandwidth of the transmission wavelength characteristic of each output port is set narrower in order to prevent one channel of signal light from being outputted from two output ports as such, then there will conversely be cases where no signal light is outputted from any output port, so that the signal number cannot be counted accurately.

If temperature control is carried out such that the temperature of the arrayed waveguide diffraction grating type demultiplexer is held constant, then the above-mentioned wavelength shift can be prevented, whereby the signal number can be counted accurately. Since the arrayed waveguide diffraction grating type optical demultiplexer is additionally provided with temperature control means in this case, however, it is problematic in that the apparatus increases its size and cost of manufacture, and so forth.

In view of the foregoing problems, it is an object of the present invention to provide a wavelength division multiplexing signal number monitoring apparatus and method which can accurately count the signal number independently of temperature.

The present invention provides a wavelength division multiplexing signal number monitoring apparatus for monitoring the number of signal light components (N at the maximum) included in wavelength division multiplexing signal light composed of a plurality of signal light components in which any two signal light components have a wavelength interval therebetween set to an integer multiple of Δλi. This apparatus comprises: (1) an arrayed waveguide diffraction grating type optical demultiplexer for guiding the wavelength division multiplexing signal light, demultiplexing the guided signal light at a wavelength interval of $\Delta\lambda o$ (where $\Delta\lambda o=\Delta\lambda i/m$, m being an integer of at least two), and outputting demultiplexed individual light components respectively from $m\times(N+l)$ output ports (where l is a predetermined integer of at least one); (2) a light-receiving device array comprising $m\times(N+l)$ light-receiving devices disposed so as to correspond to the respective output ports; and (3) a counter unit for receiving an output signal of each light-receiving device of the light-receiving device array and determining the number of signal light components included in the wavelength division multiplexing signal light according to the number of light-receiving devices which have detected light having a predetermined level or higher in each of m light-receiving device groups each combining (N+l) light-receiving devices together such that the light components to be detected have a wavelength interval of $\Delta\lambda i$.

On the other hand, the present invention provides a wavelength division multiplexing signal number monitoring method for monitoring the number of signal light components (N at the maximum) included in the above-mentioned wavelength division multiplexing signal light, the method comprising the steps of demultiplexing the wavelength division multiplexing signal light at a wavelength interval of $\Delta\lambda o$ (where $\Delta\lambda o=\Delta\lambda i/m$, m being an integer of at least two); outputting demultiplexed individual light components respectively from $m\times(N+l)$ output ports (where l is an integer of at least one); detecting whether the light components outputted from the respective output ports have at least a predetermined level or not; counting the number of output ports each detected to have yielded a light component having at least the predetermined level in each of m output port groups each grouping (N+l) output ports such that the outputted light components have a wavelength interval of $\Delta\lambda i$; and determining according to a result thereof the number of signal light components included in the wavelength division multiplexing signal light.

In accordance with the present invention, in each of the light-receiving device array groups (or output port groups), signal light is not detected from adjacent wavelength bands at intervals of m-th wavelength band among the divided wavelength bands. Even when the wavelength band of one signal light component extends over a plurality of wavelength bands, the possibility of these wavelength bands of signal light being outputted at the same time is limited to m output ports whose output wavelength bands are adjacent to each other among all the output ports, whereby the same signal light component would not be outputted nor detected from two output ports at the same time in each light-receiving device (output port) array group. Also, since the interval upon branching is shorter than the interval in signal light, two signal light components would not be outputted from the same output port. Therefore, signal light can accurately be counted independently of temperature fluctuations. Further, when a margin is provided (l is made greater) for the wavelength band, the signal light wavelength will not deviate from the demultiplexing region even if a temperature shift occurs, whereby reliable measurement can be carried out. Also, since it becomes unnecessary for the optical demultiplexer to be kept at a constant temperature, no temperature control apparatus is necessary, whereby the apparatus can be made smaller at a lower cost.

Preferably, the number of light-receiving devices (output ports) having detected light with a predetermined level or higher in each light-receiving device array group (output port group) is taken as a detection signal light number, and the maximum detection signal light number in all the light-receiving device array groups (output port groups) is determined as the number of signal light components included in the wavelength division multiplexing signal light.

Since the wavelength shifts accompanying temperature changes in each waveguide of an arrayed waveguide diffraction grating type optical demultiplexer occur in the same direction, output port groups or light-receiving device array groups in which the transmission center wavelength of each waveguide, i.e., the output center wavelength of the output port, coincides with the center wavelength of signal light are equivalent to those subjected to appropriate temperature correction, whereby an accurate detection signal light number is obtained. As the deviation between these wavelengths becomes greater, the output port groups or light-receiving device array groups are less likely to detect signal light, thus yielding a smaller detection signal light number. Hence, the maximum detection signal light number can be determined as the accurate signal light number. Here, though m can be made greater, setting m=2 is preferable since it is compatible with compactness in apparatus.

The output characteristic to each output port upon branching is preferably set such that the difference from the center wavelength at a wavelength shifted from the center wavelength by $\pm\Delta\lambda o/2$ is smaller than 4 dB.

When the output characteristic is set as such, the overlap in transmission bands between output ports having wavelength bands adjacent to each other can be made sufficiently large. As a result, even in the case where signal light has a wavelength lying between the respective center wavelengths of output ports whose wavelength bands are adjacent to each other, it can be outputted with a sufficient level from any of the output ports.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
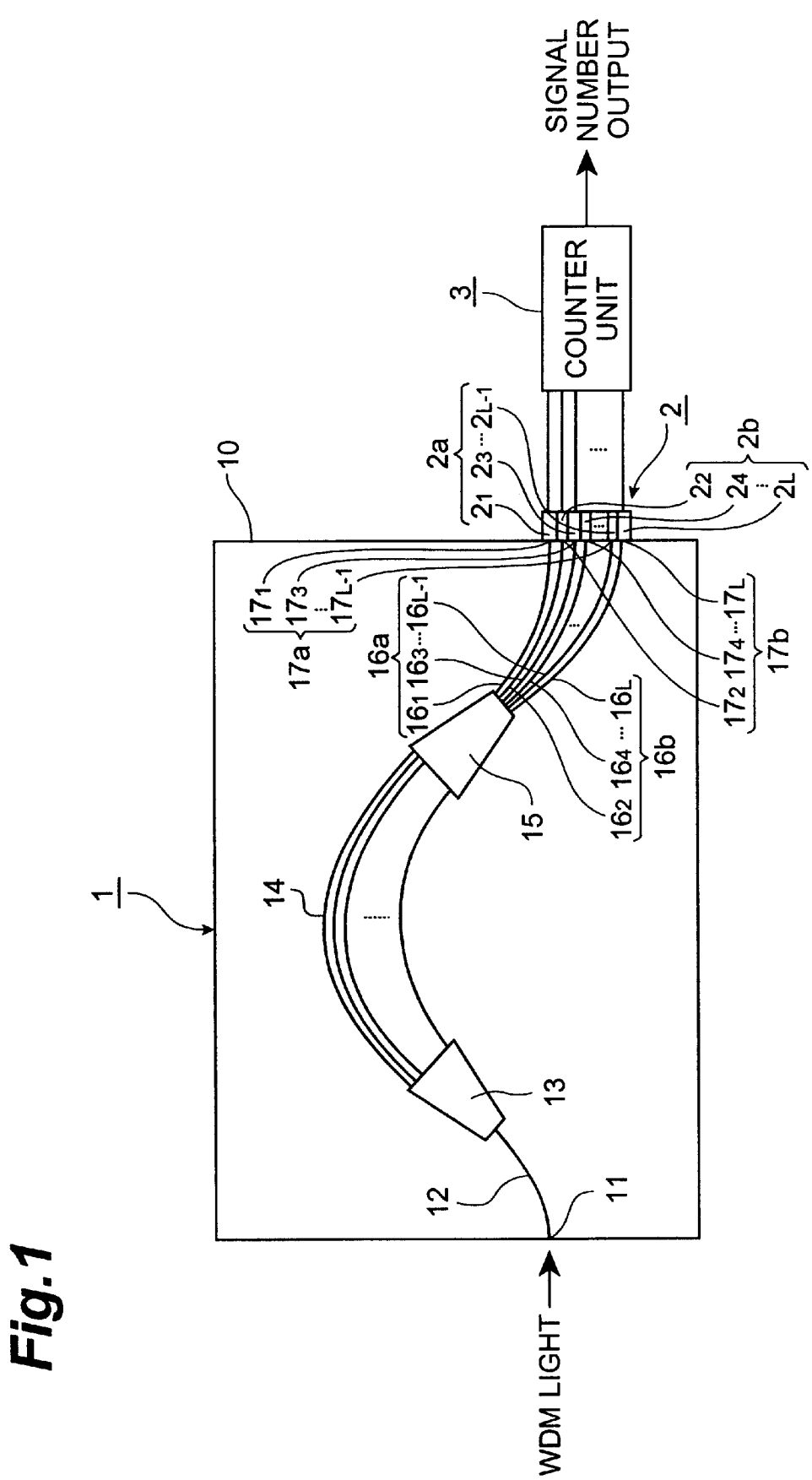
FIG. 1 is a block diagram showing an embodiment of wavelength division multiplexing signal number monitoring apparatus in accordance with the present invention.

In the following, preferred embodiments of the wavelength division multiplexing signal number monitoring apparatus in accordance with the present invention will be explained in detail with reference to the drawings. To facilitate the comprehension of the explanation, the same reference numerals denote the same parts, where possible, throughout the drawings, and a repeated explanation will be omitted. Also, the ratios of dimensions in the drawings do not always match those explained.

FIG. 1 is a block diagram showing an embodiment of wavelength division multiplexing signal number monitoring apparatus in accordance with the present invention. This wavelength division multiplexing signal number monitoring apparatus has an arrayed waveguide diffraction grating type optical demultiplexer 1 (hereinafter also referred to as optical demultiplexer) and a photodiode array 2. Though the optical demultiplexer 1 is an arrayed waveguide diffraction grating type optical multiplexer/demultiplexer which also functions as an optical multiplexer if its input and output ends are interchanged, it is employed only as an optical demultiplexer in this wavelength division multiplexing signal number monitoring apparatus.

In the following explanation, let the signal wavelength interval $\Delta\lambda i$ between channels of the wavelength division multiplexing signal light subjected to signal number monitoring be 0.4 nm, and the maximum signal number Nch be 32 channels.

The optical demultiplexer 1 demultiplexes wavelength division multiplexing signal light by $\Delta\lambda o$ which is 1/m (where m is an integer of at least two) of the signal wavelength interval $\Delta\lambda i$ between channels in a wavelength band broader than the signal wavelength band of the wavelength division multiplexing signal light. The following explanation relates to the case where m=2 by way of example. In the optical demultiplexer 1, an input-side channel waveguide 12 having an input port 11 at an end part thereof; a first slab waveguide 13 connected to the input-side channel waveguide 12; an arrayed waveguide section 14, connected to the first slab waveguide 13, comprising a plurality of channel waveguides having respective optical path lengths different from each other; a second slab waveguide 15 connected to the array waveguide section 14; and an even number of (L), e.g., 72, output-side channel waveguides $16_1$ to $16_L$ having respective end parts acting as output ports $17_1$ to $17_L$ are formed on a substrate 10.

Of the individual output-side channel waveguides $16_1$ to $16_L$, the odd-numbered waveguides $16_1, 16_3, 16_5, \ldots, 16_{L-1}$ are referred to as a first output-side channel waveguide group 16a, whereas the even-numbered waveguides $16_2, 16_4, 16_6, \ldots, 16_L$ are referred to as a second output-side channel waveguide group 16b. Also, the output ports $17_1, 17_3, 17_5, \ldots, 17_{L-1}$ connected to the respective waveguides of the first output-side channel waveguide group 16a are referred to as a first output port group 17a, whereas the output ports $17_2, 17_4, 17_6, \ldots, 17_L$ connected to the respective waveguides of the second output-side channel waveguide group 16b are referred to as a second output port group 17b.

Here, the wavelength interval $\Delta\lambda o$ between the respective center wavelengths of the signal light components outputted to adjacent i-th and (i+1)-th output ports $17_i$, $17_{i+1}$ (where i is an integer satisfying $1 \leq i \leq L-1$) among the individual output ports is set to 0.2 nm which is one half of the signal wavelength interval $\Delta\lambda i$ between the channels of wavelength division multiplexing signal light to be monitored as mentioned above. Therefore, the wavelength interval between the respective center wavelengths of the signal light components outputted to adjacent output ports in the same output port group, i.e., i-th and (i+2)-th output ports $17_i$, $17_{i+2}$ (where i is an integer satisfying $1 \leq i \leq L-2$), would coincide with $2 \times \Delta\lambda o$, i.e., the signal wavelength interval $\Delta\lambda i$ between the channels of wavelength division multiplexing signal light to be monitored.

At the respective end parts of the output ports $17_1$ to $17_L$ in the optical demultiplexer 1, L photodiodes $2_1$ to $2_L$ are disposed so as to correspond thereto one by one, thereby constituting the photodiode array 2. The photodiodes $2_1, 2_3, 2_5, \ldots, 2_{L-1}$ connected to the first output port group 17a are referred to as a first photodiode group 2a, whereas the photodiodes $2_2, 2_4, 2_6, \ldots, 2_L$ connected to the second output port group 17b are referred to as a second photodiode group 2b.

A counter unit 3 is connected to the photodiode array 2, so that respective output signals of the photodiodes $2_1$ to $2_L$ are fed into this counter unit 3. The counter unit 3 determines whether or not signal light is detected by the individual photodiodes $2_1$ to $2_L$ according to a predetermined determination condition such as a threshold value for signal levels, calculates/counts the signal number of signal light components being transmitted in the wavelength division multiplexing signal light at this point in time according to the result of determination, and outputs the signal number.

First, an operation of the wavelength division multiplexing signal number monitoring apparatus at a reference temperature T0 (45.5° C. here), i.e., the wavelength division multiplexing signal number monitoring method in accordance with the present invention, will be explained.

Figure 2:
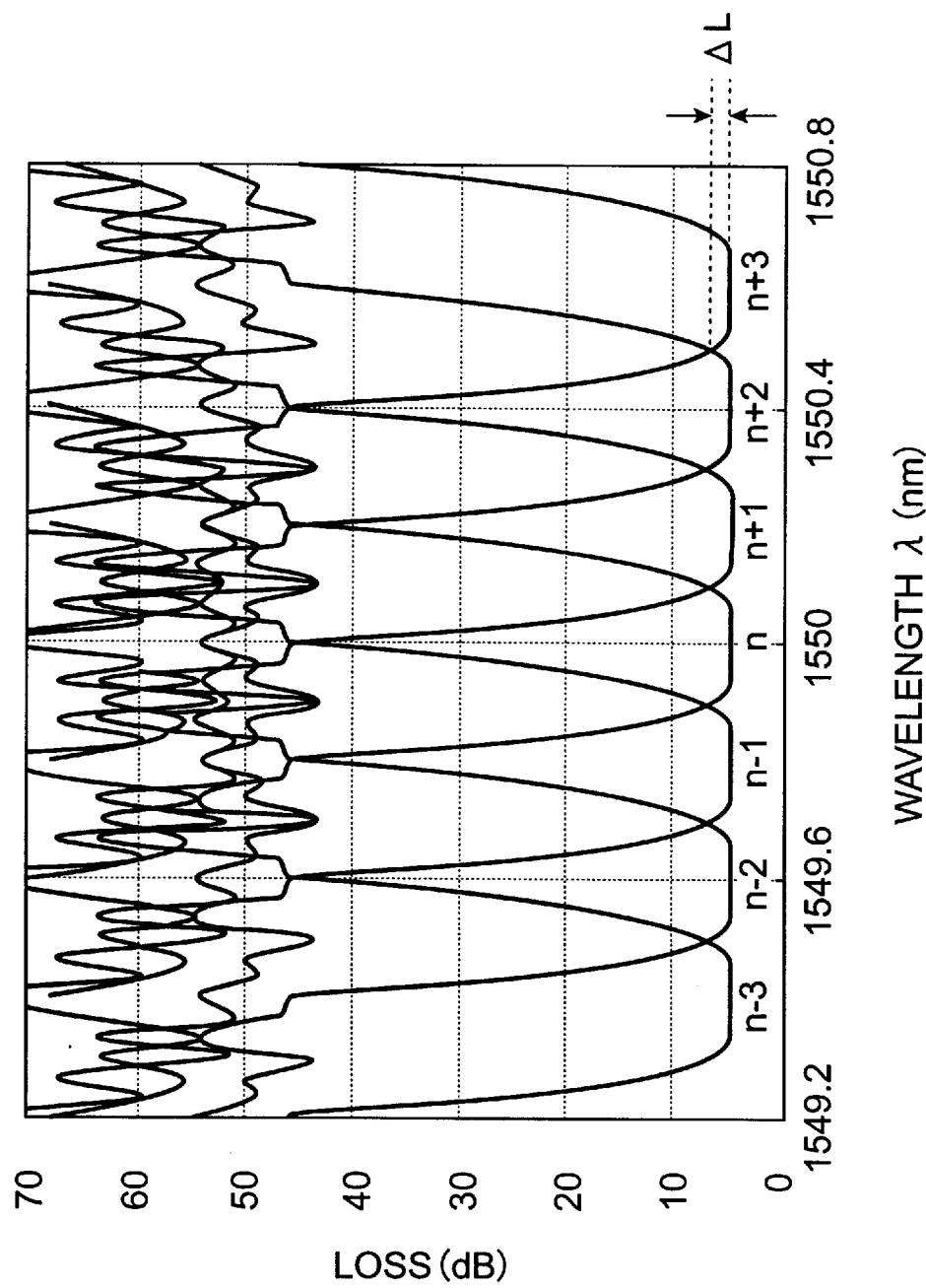
FIG. 2 is a graph showing transmission wavelength characteristics of output ports in the wavelength division multiplexing signal number monitoring apparatus shown in FIG. 1.

FIG. 2 is a graph showing transmission wavelength characteristics of signal light components transmitted/guided through the individual output-side channel waveguides $16_i$ and outputted from their corresponding output ports $17_i$. In this graph, as for an example of transmission characteristics at the reference temperature, while the output wavelength (center wavelength of a transmission characteristic distribution curve) of the n-th (even-numbered) output port $17_n$ is set to a wavelength of 1550 nm, characteristic curves indicating the respective wavelength characteristics of seven output ports $17_{n-3}$ to $17_{n+3}$ including those prior/subsequent thereto are shown.

Here, the abscissa indicates the wavelength $\lambda$ (nm) of signal light, whereas the ordinate indicates the loss characteristic (dB) corresponding to each output port $17_i$ (i=n−3 to n+3). Here, the signal light component in a wavelength range having a lower loss value is the output wavelength component transmitted/outputted from each output port, whereas the center wavelength of this wavelength range is the output wavelength of the output port. The individual curves of the graph are indicated by their corresponding output port numbers n−3 to n+3.

Into the optical demultiplexer 1, wavelength division multiplexing signal light comprising a plurality of signal light components having signal wavelengths different from each other is fed from the input port 11. Here, among the signal light components included in the wavelength division multiplexing signal light, one signal light component is assumed to have a signal wavelength $\lambda a$ of 1550 nm.

Namely, this wavelength division multiplexing division signal light includes therein signal light components whose signal wavelength is (1550±j×Δλi) nm within a predetermined band (having a bandwidth of 12.4 nm).

Thus inputted light is demultiplexed while being guided through the input-side channel waveguide 12, first slab waveguide 13, arrayed waveguide section 14, and second slab waveguide 15 in succession. The demultiplexed signal light components having their respective wavelengths are branched/guided into a plurality of output-side channel waveguides $16_1$ to $16_L$ and are outputted from their corresponding output ports $17_1$ to $17_L$.

Since the signal light components included in the wavelength division multiplexing signal light are configured as mentioned above, they are not outputted to all the output ports $17_1$ to $17_L$, but only to the output port $17_n$ and its prior/subsequent every other output ports $17_{n-4}$ (1549.2 nm), $17_{n-2}$ (1549.6 nm), $17_n$ (1550 nm), $17_{n+2}$ (1550.4 nm), and $17_{n+4}$ (1550.8 nm) in the second output port group 17b. Namely, the number of signal light components outputted from the output ports of the second output port group 17b equals the signal number of the inputted wavelength division multiplexing signal light.

Thus, the signal light components outputted from the output ports of the second output port group 17b are detected by the respective photodiodes of the second photodiode group 2b, so as to be converted into electric signals, which are sent to and processed by the counter unit 3. Whether or not signal light is detected by the individual photodiodes is determined according to a threshold level $P_{th}$ preset in the counter unit 3 connected to the photodiode array 2, and those yielding a light-receiving power output P not lower than the threshold level $P_{th}$ are counted as those having detected the signal light. The threshold level $P_{th}$ is needed to be set appropriately such that, when the wavelength of signal light and the transmission center wavelength of the output port $17_n$ substantially coincide with each other, it is higher than the level of signal light incident on ports other than the corresponding output port $17_n$. Thus, counting the number of photodiodes having detected signal light in the second photodiode group 2b can determine the number of signal light components.

Figure 3:
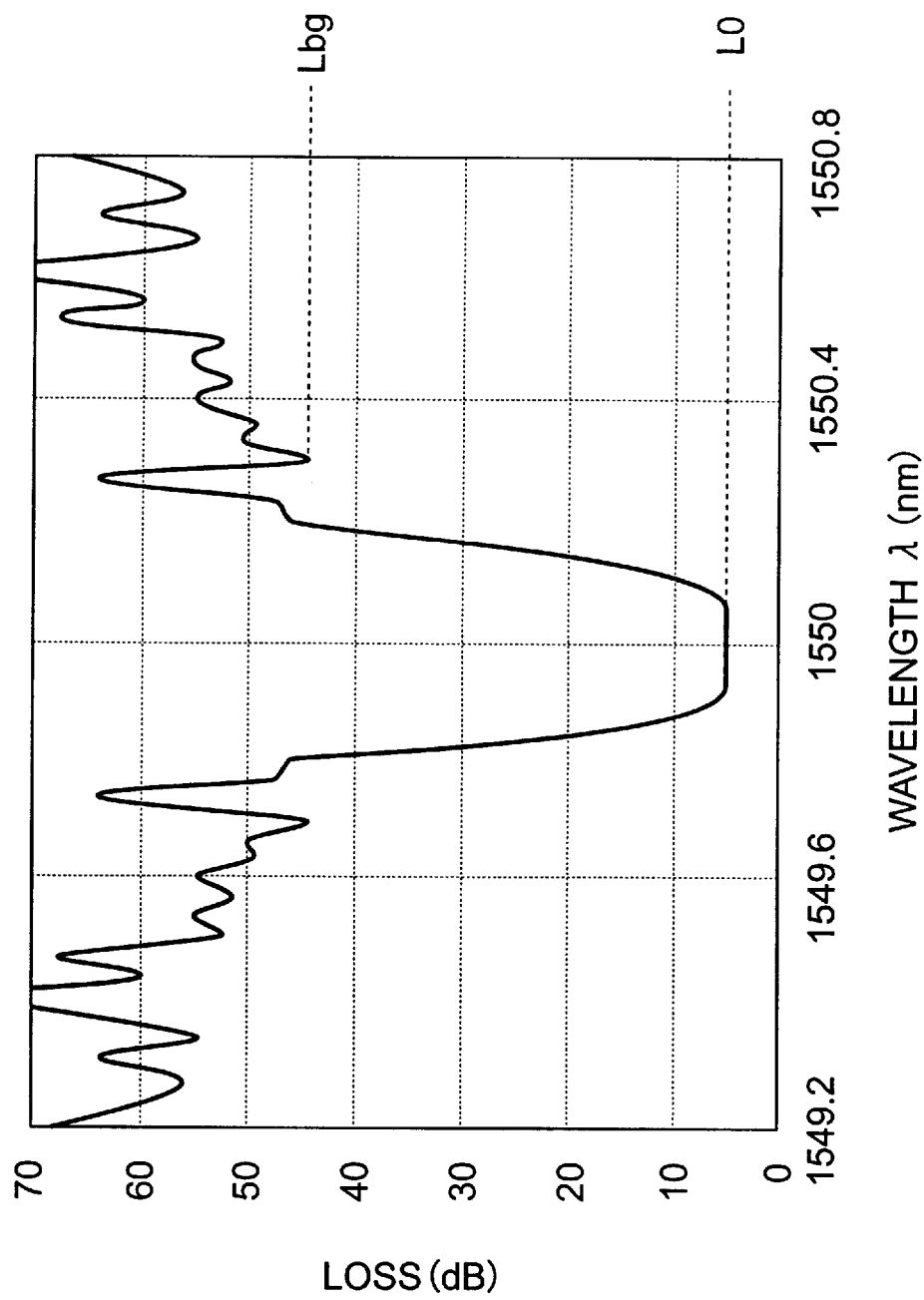
FIG. 3 is a graph for explaining light-receiving power and background levels in a transmission wavelength characteristic of an output port.

Further, the threshold level $P_{th}$ is needed to be set to such a value that the light-receiving power level due to signal light and the light-receiving power level (background level) caused by leaked light from a plurality of channels are sufficiently distinguishable from each other. FIG. 3 shows a transmission wavelength characteristic curve in a certain output port at a certain temperature. Preferably, the threshold level $P_{th}$ is set according to $$P_{th}=P_{max}+D$$

using the maximum light-receiving power $P_{max}$ and the value D obtained by $$\begin{aligned}D &= L0 - Lbg + 10 \times \log(Nch)\\ &= 5.0 - 44.2 + 15.1\\ &= -24.1 \text{ (dB)}\end{aligned}$$

from the minimum value L0 of loss level at the center wavelength of the depicted curve and the minimum value Lbg of background level caused by leaked light.

While power often fluctuates among individual channels of signal light in wavelength division multiplexing transmission systems, it is preferred that the value of the above-mentioned value D be set sufficiently greater than the extent of these fluctuations, so as not to be influenced thereby. In practice, the fluctuations are about 5 dB, which value is sufficiently smaller than the above-mentioned threshold level, i.e., 24.1 dB.

On the other hand, the power of signal light components outputted from the output ports in the first output port group 17a is so small that the light-receiving power in the first photodiode group 2a becomes smaller than the threshold level $P_{th}$, whereby the signal number is not detected.

A counting operation in the case where a wavelength shift is generated in the transmission characteristics of the output port groups 17a, 17b upon a temperature fluctuation will now be explained. Assuming that the temperature dependence dλ/dT of transmission wavelength characteristics of the output ports in the optical demultiplexer 1 is 0.1 nm/10° C., the characteristic curve for the transmission wavelength characteristic of each output port will shift toward the longer wavelength side (rightward in FIG. 2) by 0.1 nm as temperature rises by 10° C. from the above-mentioned reference temperature T0.

Figure 4:
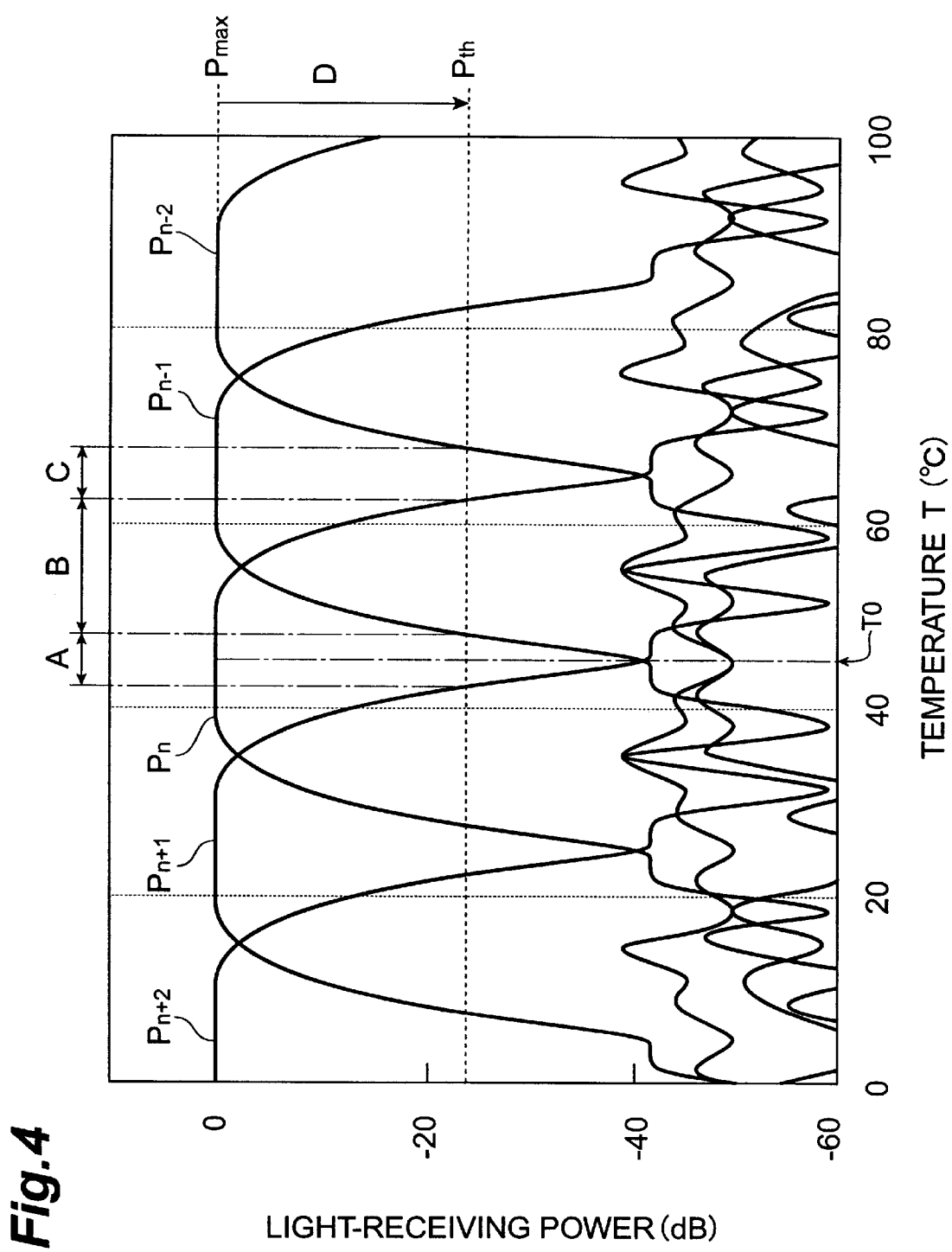
FIG. 4 is a graph showing the temperature dependence of the light-receiving power of each output port with respect to a specific signal wavelength of signal light.

FIG. 4 shows the changes in light-receiving power P detected by the individual photodiodes $2_1$ to $2_L$ with temperature in the case where only the above-mentioned wavelength λa (1550 nm) of signal light is inputted to the wavelength division multiplexing signal number monitoring apparatus. Here, let $P_i$ be the light-receiving power outputted from the i-th photodiode $2_i$, and $P_{max}$ be the maximum power thereof. FIG. 4 shows the changes in light-receiving power with the maximum power $P_{max}$ being standardized at 0 dB.

As can be seen from the operation at the above-mentioned reference temperature T0, the signal light component having the wavelength λa is detected only by the n-th photodiode $2_n$ at the reference temperature T0 and within its nearby temperature range A. Namely, only the light-receiving power of the n-th photodiode $2_n$ exceeds the threshold level $P_{th}$.

If temperature rises from T0 and enters temperature range B, then the respective output wavelengths of the output ports $17_n$ and $17_{n-1}$ shift toward the longer wavelength side, so that the signal wavelength λa of signal light is positioned within their intermediate region, whereby the signal light is outputted to both of these adjacent two output ports $17_n$ and $17_{n-1}$. Therefore, both of the (n−1)-th and n-th photodiodes $2_{n-1}$, $2_n$ yield respective light-receiving powers $P_{n-1}$, $P_n$ exceeding the threshold level $P_{th}$, thus being considered to have detected the signal light component having the wavelength λa.

If temperature further rises to enter temperature range C, the respective output wavelengths of the output ports $17_n$ and $17_{n-1}$ shift toward the longer wavelength side, so that the above-mentioned wavelength of signal light is located outside the output wavelength region of the output port $17_n$ and belongs only to the output wavelength region of the output port $17_{n-1}$, whereby this signal light component is outputted to only the output port $17_{n-1}$. As a result, only the light-receiving power $P_{n-1}$ of the (n−1)-th photodiode $2_{n-1}$ exceeds the threshold level $P_{th}$, whereby the signal light component having the wavelength λa is detected only by the (n−1)-th photodiode $2_{n-1}$.

Similarly, along with the above-mentioned temperature shift, a specific channel of signal light alternately generates respective states where it is outputted to a single output port and two adjacent output ports (belonging to different output ports, respectively). Since the output wavelength interval Δλo is set to ½ of the signal wavelength interval Δλi, the wavelength division multiplexing signal light as a whole alternately generates respective states where each signal light component is outputted to a single output port and two adjacent output ports (belonging to different output ports, respectively).

In any case, the same output port group 17a (or 17b) are in one of states where no signal light components are outputted to any of the output ports and where a specific signal light component is outputted to only a specific output port in the output port group whereas no other signal light components are outputted to this output port. Namely, the number of photodiodes having detected signal light in the same photodiode group 2a, 2b becomes the signal light number or 0. Therefore, if the greater number of photodiodes having detected signal light in the photodiode groups 2a and 2b is determined as the signal light number by the counter unit 3, then the signal number can always be counted accurately regardless of shifts in transmission wavelength characteristics caused by changes in temperature.

Since it is unnecessary for this signal number monitoring apparatus to carry out any temperature control for the arrayed waveguide diffraction grating type optical demultiplexer 1, the apparatus can be made smaller, and its manufacturing steps can be simplified, so as to cut down the cost of manufacture.

It is preferred that L, which is the number of output ports in the optical demultiplexer 1 and the number of photodiodes in the photodiode array 2, be set according to the whole wavelength range combining the wavelength band of wavelength division multiplexing signal light to be measured (Nch×Δλi) and the wavelength fluctuation ranges caused by changes in temperature of the measuring apparatus on both of the longer and shorter wavelength sides from the wavelength band ($T_{max} \times d\lambda/dT$ each, where $d\lambda/dT$ is the temperature dependence of output wavelength).

Such a preferable output port number can be determined by the following expression:

$$L=(Nch \times \Delta\lambda_i + 2 \times T_{max} \times d\lambda/dT)/(\Delta\lambda o)$$

The above-mentioned embodiment would respond to the temperature changing range of ±60° C. Without being restricted to this range, the permissible temperature range may be set to ranges necessary for various apparatus. As a matter of course, the number of output ports may be made greater than thus determined number, so as to set the wavelength range broader, and the margin for the wavelength band of the wavelength division multiplexing signal to be measured may be narrowed in conformity to expected temperature fluctuations.

Though there are cases where the signal wavelength interval between the individual channels of signal light yields a deviation of about 0.1 nm, there will be no problems in terms of measurement if the deviation is 0.15 nm or less in the above-mentioned embodiment, for example.

In the transmission wavelength characteristics of individual output ports in the optical demultiplexer 1 shown in FIG. 2, it is preferred that the overlap between the respective transmission characteristics of adjacent output ports be set sufficiently large. If the overlap is too small (the individual bandwidths are too narrow), then, when the signal wavelength is a wavelength in the intermediate region of output wavelengths, it will not be outputted/detected from any output port, or the light-receiving power thereof will be lower. In order to prevent such a state from occurring, the overlap is made sufficiently larger, so that, even if a wavelength shift occurs, it will always be outputted from any output port with a sufficient power. As for a preferred condition therefor, it is desirable that, with respect to the transmission loss at the center wavelength of an output port, the transmission loss difference (ΔL shown in FIG. 2) at a wavelength deviating from the center wavelength by Δλo/2 be set to a value smaller than +4 dB.

The wavelength division multiplexing signal number monitoring apparatus in accordance with the present invention is not limited to the embodiment mentioned above, whereas various modifications as well as changes in setting are possible.

Figure 5:
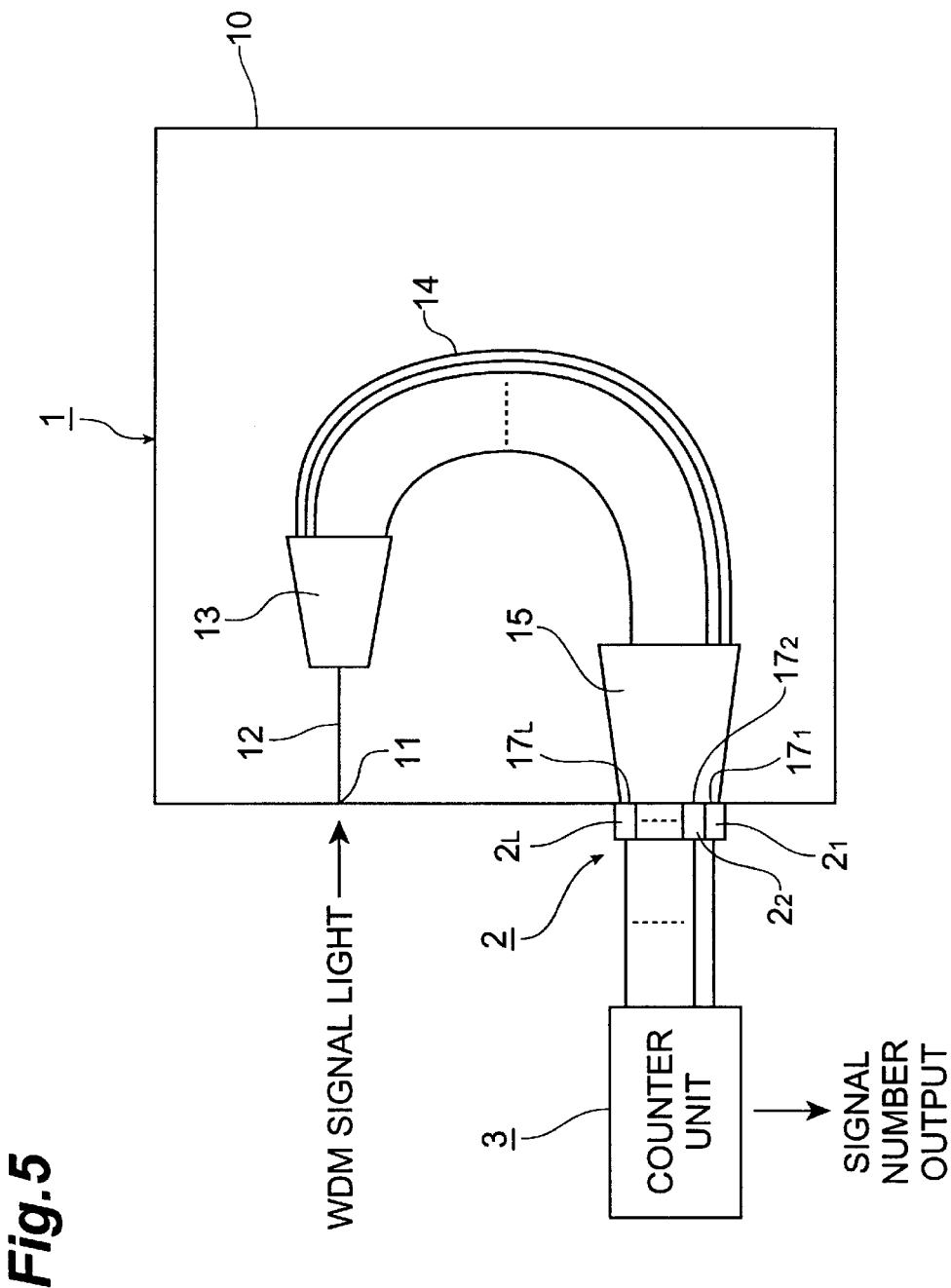
FIG. 5 is a block diagram showing another embodiment of the wavelength division multiplexing signal number monitoring apparatus in accordance with the present invention.
Figure 6:
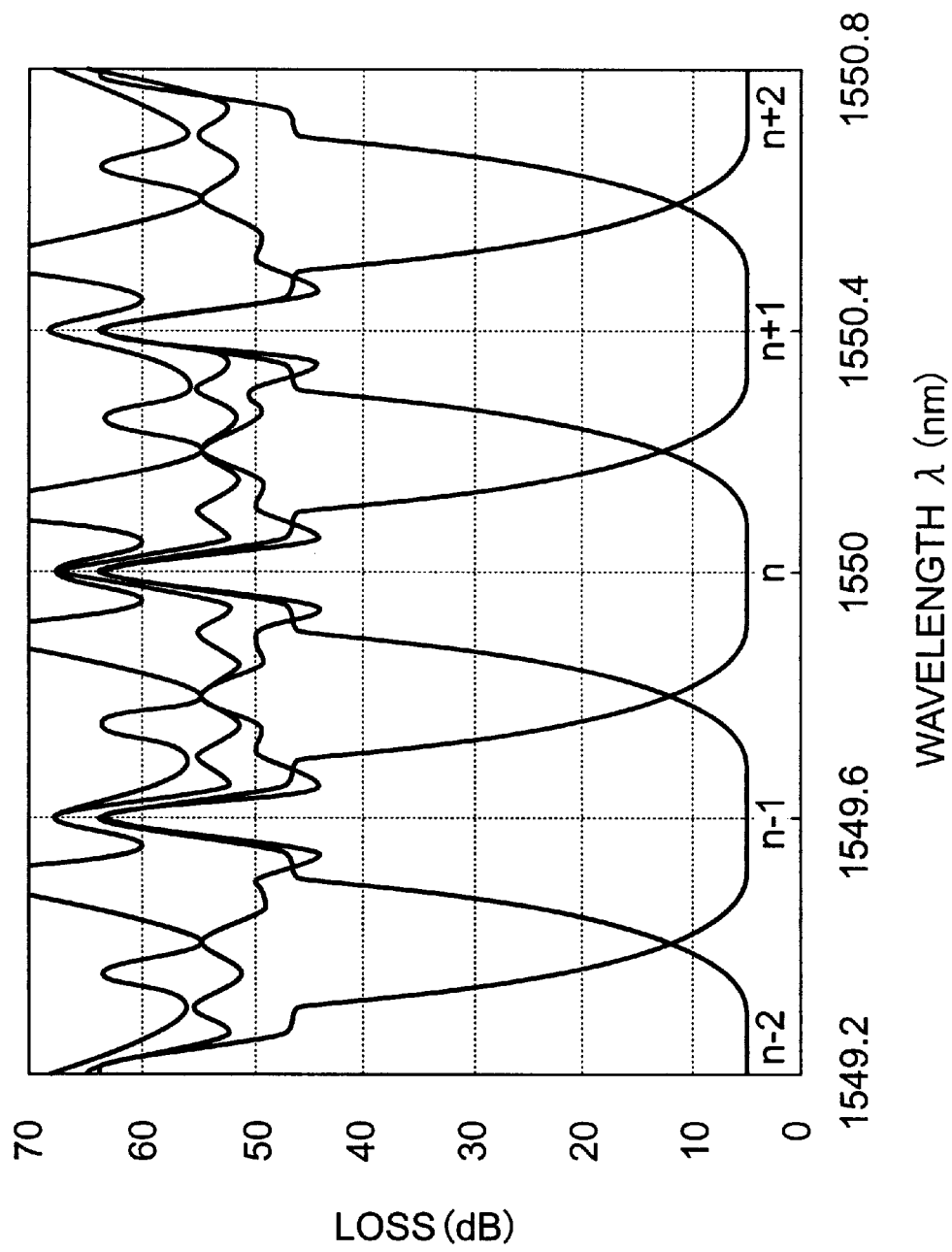
FIG. 6 is a graph showing transmission wavelength characteristics of output ports in a conventional wavelength division multiplexing signal number monitoring apparatus.

FIG. 5 is a block diagram showing another embodiment of the wavelength division multiplexing signal number monitoring apparatus in accordance with the present invention. In this embodiment, the optical demultiplexer 1 is not formed with L output-side channel waveguides $16_1$ to $16_L$, whereas the photodiode array 2 is directly connected to the second slab waveguide 15.

Since the signal light is continuously demultiplexed by a predetermined chromatic dispersion at the output end of the second slab waveguide 15, this configuration can also cause the parts of the output end connected to the individual photodiodes $2_1$ to $2_L$ of the photodiode array 2 to function as output ports $17_1$ to $17_L$, respectively, so as to realize a signal number monitoring apparatus similar to that of the embodiment shown in FIG. 1. Not only this configuration but also various modes of arrayed waveguide diffraction grating type optical demultiplexers can be employed.

Also, though the output wavelength interval Δλo in the optical demultiplexer is set to ½ of the signal wavelength interval Δλi of the inputted wavelength division multiplexing signal light in each of the above-mentioned embodiments, signal number monitoring apparatus which accurately count the signal number independently of temperature as in the above-mentioned embodiments can be made if the former interval Δλo is set to 1/m of the latter interval Δλi by use of an integer m which is 2 or greater in general.

For example, in the case where Δλo=Δλi/3, L output ports $17_1$ to $17_L$ (L being a multiple of 3) are grouped into three output port groups composed of a first output port group 17a comprising output ports $17_1$, $17_4$, $17_7$, . . . , $17_{L-2}$, a second output port group 17b comprising output ports $17_2$, $17_5$, $17_8$, . . . , $17_{L-1}$, and a third output port group 17c comprising output ports $17_3$, $17_6$, $17_9$, . . . , $17_L$, the detection number is determined for each output port group, and the maximum number among the three detection numbers is taken as the signal number of wavelength division multiplexing signal light, whereby a signal number monitoring apparatus independent of temperature is realized.

As for the integer m of 4 or greater, it will be sufficient if L (which is a multiple of m) output ports are similarly sectioned into m output port groups each grouping output ports in which the wavelength interval of their output wavelengths is Δλi, the detection number is determined for each output port group, and the greatest detection number among the m detection numbers is taken as the signal number. In this case, for measuring Nch, m×(N+l) output ports (photodiodes) are necessary. Here, l is the margin for the temperature shift. However, the setting where m=2 as in the above-mentioned embodiments is preferable in that the apparatus configuration can be made simpler and smaller.

The signal number counting processing method in the counter unit is not restricted to the counting method explained in conjunction with the above-mentioned embodiments, but the counting processing may also be carried out by other methods according to transmission characteristics of individual output ports, setting of threshold levels, and the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength division multiplexing signal number monitoring apparatus for monitoring the number of signal light components (N at the maximum) included in wavelength division multiplexing signal light composed of a plurality of signal light components in which any two signal light components have a wavelength interval therebetween set to an integer multiple of $\Delta\lambda i$, said apparatus comprising:

an arrayed waveguide diffraction grating type optical demultiplexer for guiding said wavelength division multiplexing signal light, demultiplexing thus guided signal light at a wavelength interval of $\Delta\lambda o$ (where $\Delta\lambda o=\Delta\lambda i/m$, m being an integer of at least two), and outputting demultiplexed individual light components respectively from m×(N+1) (where 1 is a predetermined integer of at least one) different output ports;

a light-receiving device array comprising m×(N+1) light-receiving devices disposed so as to correspond to said respective output ports; and a counter unit for receiving an output signal of each light-receiving device of said light-receiving device array and determining the number of signal light components included in said wavelength division multiplexing signal light according to the number of light-receiving devices which have detected light having a predetermined level or higher in each of m light-receiving device groups each combining (N+1) light-receiving devices together such that the light components to be detected have a wavelength interval of $\Delta\lambda i$.

2. A wavelength division multiplexing signal number monitoring apparatus according to claim 1, wherein said counting unit takes the number of light-receiving devices having detected light with a predetermined level or higher in each light-receiving device array group as a detection signal light number, and takes the maximum detection signal light number in all the light-receiving device array groups as the number of signal light components included in said wavelength division multiplexing signal light.

3. A wavelength division multiplexing signal number monitoring apparatus according to claim 1, wherein m equals two.

4. A wavelength division multiplexing signal number monitoring apparatus according to claim 1, wherein an output characteristic to each output port of said arrayed waveguide diffraction grating type optical demultiplexer is set such that the difference from a center wavelength at a wavelength shifted from said center wavelength by $\pm\Delta\lambda o/2$ is smaller than 4 dB.

5. A wavelength division multiplexing signal number monitoring method for monitoring the number of signal light components (N at the maximum) included in wavelength division multiplexing signal light composed of a plurality of signal light components in which any two signal light components have a wavelength interval therebetween set to an integer multiple of $\Delta\lambda i$, said method comprising the steps of:

demultiplexing said wavelength division multiplexing signal light at a wavelength interval of $\Delta\lambda o$ (where $\Delta\lambda o=\Delta\lambda i/m$, m being an integer of at least two);

outputting demultiplexed individual light components respectively from m×(N+1) output ports (where 1 is an integer of at least one);

detecting whether the light components outputted from the respective output ports have at least a predetermined level or not;

counting the number of output ports each detected to have yielded a light component having at least said predetermined level in each of m output port groups each grouping (N+1) output ports such that the outputted light components have a wavelength interval of $\Delta\lambda i$; and determining according to a result of counting in each output port group the number of signal light components included in said wavelength division multiplexing signal light.

6. A wavelength division multiplexing signal number monitoring method according to claim 5, wherein the maximum value of result of counting in each output port group is determined as the number of signal light components included in said wavelength division multiplexing signal light.

7. A wavelength division multiplexing signal number monitoring method according to claim 5, wherein m equals two.

8. A wavelength division multiplexing signal number monitoring method according to claim 5, wherein an output characteristic to each output port is set such that the difference from a center wavelength at a wavelength shifted from said center wavelength by $\pm\Delta\lambda o/2$ is smaller than 4 dB.

* * * * *